March 23, 1965  L. DUTHION ETAL  3,174,581
REMOVABLE SILENCER DEVICE FOR JET ENGINES
Filed Sept. 18, 1961  2 Sheets-Sheet 1
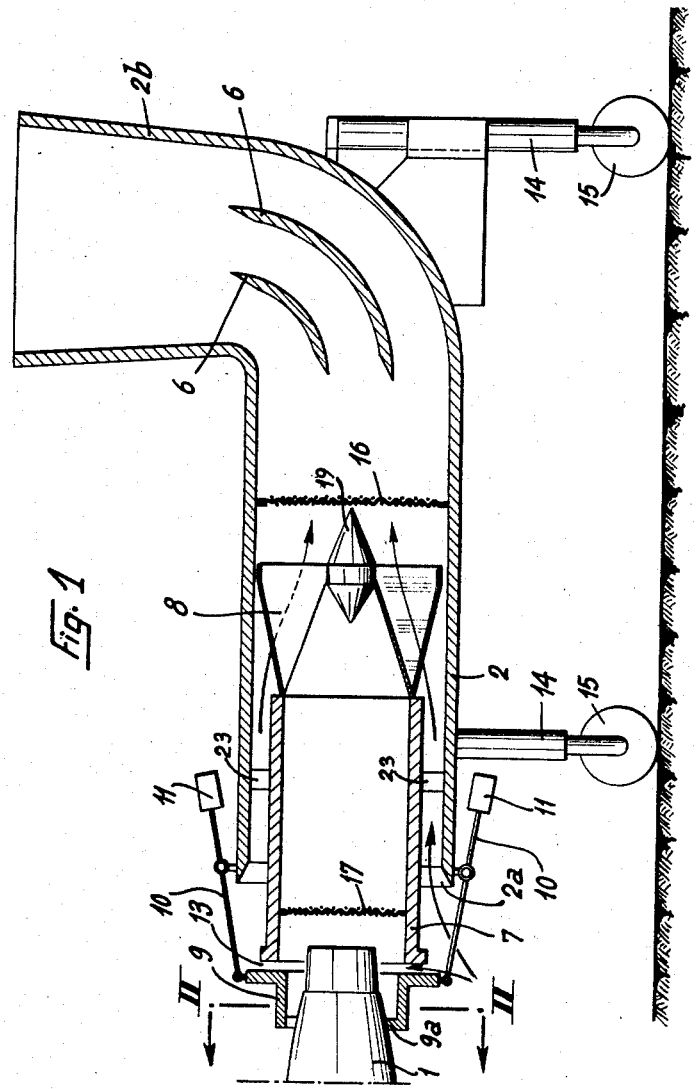
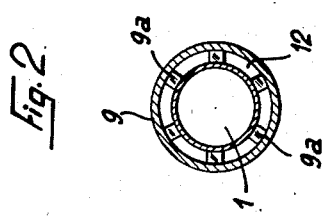
INVENTORS
Louis Duthion
Jean H. Bertin
By
Watson, Cole, Grindle & Watson
ATTORNEYS March 23, 1965  L. DUTHION ETAL  3,174,581
REMOVABLE SILENCER DEVICE FOR JET ENGINES
Filed Sept. 18, 1961  2 Sheets-Sheet 2
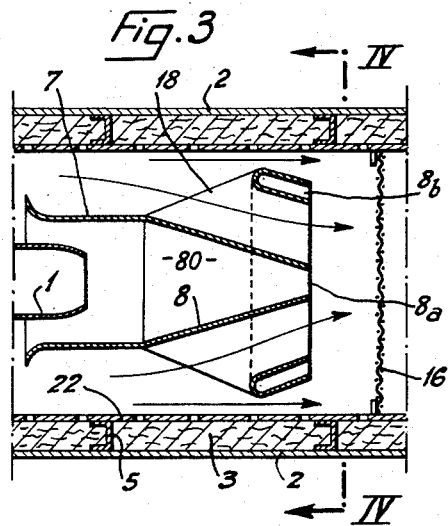
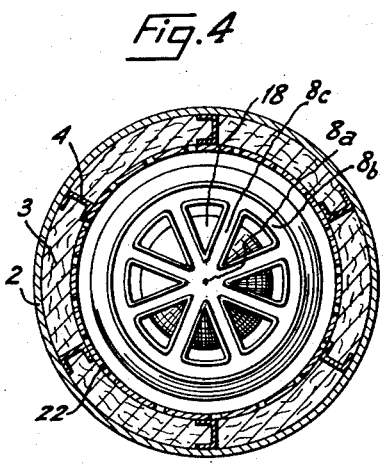
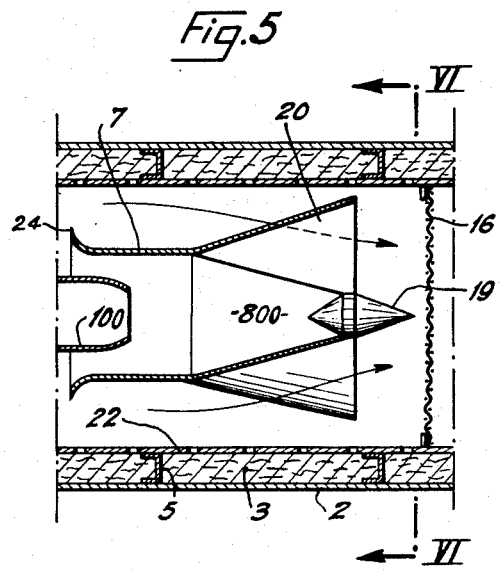
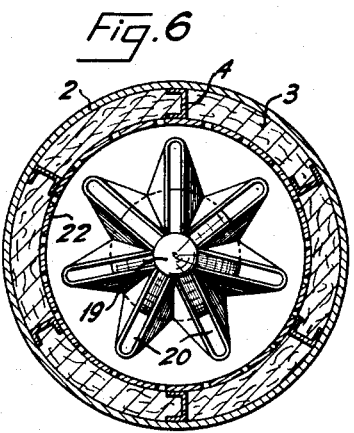
INVENTORS
Louis Duthion
Jean H. Bertin
By Watson, Cole, Grindle + Watson
ATTORNEYS

1

3,174,581
REMOVABLE SILENCER DEVICE FOR JET ENGINES
Louis Duthion, Paris, and Jean H. Bertin, Neuilly-sur-Seine, France, assignors to Societe Bertin & Cie, Paris, France, a company of France
Filed Sept. 18, 1961, Ser. No. 138,843
Claims priority, application France, Sept. 30, 1960, 840,044
8 Claims. (Cl. 181—51)

The present invention relates to a removable silencer device adapted to reduce the noise produced by the jet engines of aircraft when these are on the ground.

Such a silencer is adapted, in particular, to reduce the noise of aircraft jets when the jet engines are being tested before flight.

It is known that the noise of the jets of jet engines can be reduced by causing a certain amount of atmospheric air to be entrained by said jets by means of nozzles forming suction horns for said air. The results obtained improve with increases in the area of contact between the gases of the jet and the atmospheric air; for this purpose, the contour of the conduit for the gases of the jet expands towards the outlet of the jet and comprises flattened portions driving the jet into vanes on each side of which passes the indrawn atmospheric air. According to the invention, a removable silencer device for the jet of jet engines is composed of a first conduit extending the outlet aperture of the jet, the contour of which conduit opens out downstream into at least one flattened portion, this first conduit being surround by a second conduit which has a sound-proofed wall and which is open upstream to collect the atmospheric air and is extended downstream beyond the first this second conduit being provided internally with obstacles to homogenize the composite jet formed by the mixture of engine gases and atmospheric air beyond the outlet section of the first conduit.

In an advantageous form of embodiment of the invention, the first conduit comprises, downstream, a star-shaped section which opens out progressively and which thus divides the jet of gases into radial laminations between which is admitted the atmospheric air supplied by the second conduit; in this case, said second conduit is preferably cylindrical. Because this second conduit is cooled by the atmospheric air, its mechanical behaviour is reliable and consequently it may comprise supporting means enabling the silencer device to be brought to the mouth of the jet of the jet engine. These supporting means may be mounted on wheels in order that the device according to the invention may be set in position wherever the test is carried out. Beyond the obstacles which is contains, the second conduit may be directed vertically so as to discharge the compolsite jet of gas and air towards the sky. The chimney thus formed may be sound-proofed while the elbow of the conduit may comprise deflecting obstacles which also absorb some of the energy of the jet.

Additional obstacles which absorb the energy of the primary jet may also be arranged in the first conduit upstream of its outlet into the second.

Finally, for the connection to the mouth of a jet engine, the first conduit may comprise, on the side where said mouth comes, a cap which covers said mouth, the cap being provided with air inlets permitting the equalization of pressure in said cap as well as an initial dilution of the gases leaving the mouth.

The description which follows with reference to the accompanying drawing and which is given by way of nonlimiting example, will explain how the invention may be carried out, the features which appear both from the drawing and from the text naturally forming part of said invention.

FIGURE 1 shows in vertical section, a silencer device according to the invention;

FIGURE 2 is the section II—II through FIGURE 1;

FIGURE 3 is a partial axial section through a modification of the device comprising a nozzle supplying annular jets;

FIGURE 4 is a section on IV—IV of FIGURE 3;

FIGURE 5 is a partial axial section through another modification of the silencer device;

FIGURE 6 is a section on VI—VI in FIGURE 5.

The device shown in FIGURE 1 is adapted to be fitted to the outlet mouth of a jet engine 1 forming part of an aircraft which is not illustrated.

This device consists of a conduit 2, the wall of which is preferably sound-proofed, for example as can be seen in FIGURES 3 to 6 by means of cushions of felted fibers 3 held in position by longitudinal rails 4 and frames 5 surrounding a perforated interior metal sheet 22. The conduit 2 is open upstream (that is to say towards the jet engine 1), with a bell mouth 2a, and downstream (that is to say at the opposite side) it rises in the form of a vertical chimney 2b. The connecting elbow between the horizontal portion of the conduit 2 and the chimney 2b comprises, internally, curved vanes 6 which are preferably sound-proofed.

Inside the first conduit 2 is arranged a second conduit 7, the downstream portion of which ends in a nozzle 8 having a large peripheral extent, that is to say dividing the jet into laminations. Conduit 7 may be supported coaxially within conduit 2 by conventional means such as the radial supporting vanes 23. As illustrated in FIGURE 1, the portion of the conduit upstream of the nozzle is also preferably sound-proofed in the manner indicated for the conduit 2, that is to say by means of sound-proofing cushions held by frames and rails.

Examples of such a nozzle are illustrated in FIGURES 3 to 6, as described in more detail hereinafter.

Disposed upstream of the conduit 7 in the direction of the jet engine 1 is a circular cap or sleeve 9 supported by the articulated arms 10 and balanced by the counter-weights 11.

As FIGURE 2 shows, the cap 9, which is adapted to fit over the end of the jet engine 1, is provided internally with bosses 9a which form air passages 12 between the outlet from the jet engine and the interior of said sleeve.

Furthermore, an air passage 13 is provided between the sleeve 9 and the inlet to the conduit 7 which may likewise be sound-proofed.

The whole of the device which has just been described rests, by means of conventional jacks 14, having telescopically connected sections mounted on wheels 15 which enable it to be displaced, the jacks 14, in turn enabling the assembly to be adjusted in height for adaptation to the outlet from a given jet engine.

Downstream of the nozzle 8, the conduit 2 comprises internally the obstacles adapted to divided the jet and to homogenise it. These obstacles may consist of a grating 16 with parallel or crossed bars.

An obstacle of the same type 17 is provided inside the conduit 7.

The operation of the device which has just been described is as follows:

The jet of gas leaving the jet engine 1 passes through the conduit 7 where it strikes against the obstacle 17 which divides it and saps its energy. In the nozzle 8, this jet is opened out into thin laminations which are surrounded by the atmospheric air which enters through the aperture 2a.

Thus the atmospheric air entering at 2a is entrained, as shown by the arrows, and this air is mixed with the gases leaving the nozzle 8.

This effort of entraining the air by induction absorbs still more of the energy of the jet. Yet more of this energy is also absorbed by the obstacle 16 which homogenises the mixture of gas and air.

The division of the jet on the vanes 6 to a further cause of loss of energy and finally the jet leaving through the chimney 2b is discharged towards the sky.

In this embodiment, moreover, the passages 12 and 13 at the same time permit an additional admission of atmospheric air upstream of the obstacle 17 which has the advantage of balancing the pressures outside and inside the cap and prevents the operation of the jet engine from being disturbed.

The nozzle 80 shown in FIGURES 3 and 4 comprises a central gas passage 8a and a peripheral passage 8b which passages are separated by radial passages 8c between which are provided air passage 18 the section of which develops from the shape of a trapezium to that of a triangle with rounded angles.

In addition, the atmospheric air can pass round the circumference of the nozzle.

In the embodiment shown in FIGURES 5 and 6, as in FIGURE 1 the nozzle 800 comprises a central obturating member 19 which is tapered at its two end and this nozzle opens out into a star 20 each of the arms of which permits the passage of a lamination of gas which has emerged from the mouth of the jet engine 100. In this form, the forward end of the conduit 800 around the engine 100 is flared or bell shaped as at 24.

As the arrows show, the atmospheric air passes between the consecutive arms of the star to mix with the gases which leave through said arms.

It goes without saying that modifications may be made to the embodiments which have just been described, particularly the substitution of equivalent technical means without therefore departing from the scope of the present invention.

What we claim is:

1. A silencer device adapted to be removably fitted to the outlet mouth of a jet engine and comprising in combination a first conduit having a sound-proofed cylindrical portion of greater diameter than said mouth adapted to be located at a distance from said mouth, in substantially coaxial relationship therewith; a second conduit coaxially arranged within said portion of said first conduit and having a diameter greater than that of said mouth but smaller than that of said portion, whereby an annular space is formed between said conduits, said second conduit protruding out of said first conduit and ending, within said portion of said first conduit, in a nozzle providing air intake passages opening into said annular space and the discharge end of which comprises flattened passages respectively located between the outlet ends of said air intake passages, and jet homogenizing obstacles fitted within said second conduit.

2. The combination of claim 1, wherein said second conduit is sound-proofed.

3. The combination of claim 1, wherein said first conduit contains jet homogenizing obstacles located at a distance from said discharge end of said nozzle said jet homogenizing obstacles consist of gratings substantially perpendicular to the axes of the corresponding conduits.

4. The combination of claim 1, further comprising a cylindrical sleeve, the diameter of which is greater than the diameter of said mouth and means for supporting said sleeve, with its axis parallel to the axis of said second conduit around said mouth outside said second conduit and spaced axially from the protruding end of said second conduit, whereby an annular space for the intake of air into said second conduit is provided.

5. The combination of claim 4, wherein said sleeve is internally provided with bosses adapted to determine air passages when when said sleeve is fitted around said mouth.

6. The combination of claim 4, wherein said first conduit is mounted on wheels and said portion of said first conduit is extended by an elbow and a vertical chimney, said elbow being provided with orientating vanes.

7. The combination of claim 1 wherein said discharge end of said nozzle further comprises an annular passage surrounding said flattened passages of the outlet of said air intake passages.

8. A silencer device adapted to be removably fitted to the outlet mouth of a jet engine and comprising in combination a first conduit having a sound-proofed cylindrical portion of greater diameter than said mouth adapted to be located at a distance from said mouth, in substantially coaxial relationship therewith; a second conduit coaxially arranged within said portion of said first conduit and having a diameter greater than that of said mouth but smaller than that of said portion, whereby an annular space is formed between said conduits, said second conduit protruding out of said first conduit and ending, within said portion of said first conduit, in a nozzle, the discharge end of which comprises flattened passages, jet homogenizing obstacles fitted within said second conduit, a cylindrical sleeve, the diameter of which is greater than the diameter of said mouth, means for supporting said sleeve with its axis parallel to the axis of said second conduit, said means comprising arms articulated to said sleeve and to said first conduit and counter-weights borne by said arms for balancing the weight of said sleeve.

References Cited by the Examiner

UNITED STATES PATENTS

| 107,603 | 9/70 | Du Faur | 181—33 |
|---|---|---|---|
| 2,886,121 | 5/59 | Welbourn | 181—33 |
| 2,968,150 | 1/61 | Goebel et al. | 181—33 |
| 2,987,136 | 6/61 | Lilley et al. | 181—33 |
| 3,011,584 | 12/61 | Lemmerman et al. | 181—33 |
| 3,039,560 | 6/62 | Duthion et al. | 181—33 |
| 3,053,340 | 9/62 | Kutney | 181—33 |
| 3,084,507 | 4/63 | Kleinhans et al. | 181—33 |

FOREIGN PATENTS

| 1,171,610 | 10/58 | France. |
|---|---|---|
| 784,940 | 10/57 | Great Britain. |
| 791,112 | 2/58 | Great Britain. |
| 831,776 | 3/60 | Great Britain. |

LEO SMILOW, *Primary Examiner.*

C. W. ROBINSON, R. R. KINSEY, *Examiners.*